United States Patent
Thomas et al.

(10) Patent No.: US 10,535,047 B1
(45) Date of Patent: Jan. 14, 2020

(54) SYSTEMS AND METHODS FOR FINANCIAL OPERATIONS PERFORMED AT A CONTACTLESS ATM

(71) Applicant: Wells Fargo Bank, N.A., San Francisco, CA (US)

(72) Inventors: Michael R. Thomas, San Francisco, CA (US); Jerome Rhodes, Hayward, CA (US); Hemesh Yadav, Charlotte, NC (US); Steven E. Puffer, Champlin, MN (US)

(73) Assignee: Wells Fargo Bank N.A., San Francisco, CA (US)

( * ) Notice: Subject to any disclaimer, the term of this patent is extended or adjusted under 35 U.S.C. 154(b) by 437 days.

(21) Appl. No.: 15/351,767

(22) Filed: Nov. 15, 2016

Related U.S. Application Data

(60) Provisional application No. 62/257,519, filed on Nov. 19, 2015.

(51) Int. Cl.
  *G06Q 20/10* (2012.01)
  *G06Q 20/40* (2012.01)
  *G06Q 20/36* (2012.01)

(52) U.S. Cl.
  CPC ....... *G06Q 20/1085* (2013.01); *G06Q 20/367* (2013.01); *G06Q 20/405* (2013.01); *G06Q 20/4012* (2013.01)

(58) Field of Classification Search
  CPC ............. G06Q 20/1085; G06Q 20/405; G06Q 20/367; G06Q 20/4012
  See application file for complete search history.

(56) References Cited

U.S. PATENT DOCUMENTS

| | | | | |
|---|---|---|---|---|
| 5,491,691 A | * | 2/1996 | Shtayer | H04J 3/247 370/395.42 |
| 6,442,532 B1 | * | 8/2002 | Kawan | G06Q 20/04 380/247 |
| 10,019,607 B2 | | 7/2018 | Hopt | |
| 10,157,364 B1 | * | 12/2018 | Koeppel | G06Q 50/30 |
| 2001/0044777 A1 | * | 11/2001 | Haley | G06Q 20/1085 705/43 |
| 2003/0200179 A1 | * | 10/2003 | Kwan | G06Q 20/04 705/65 |
| 2004/0204078 A1 | * | 10/2004 | Fare | G06Q 20/108 455/557 |
| 2006/0184456 A1 | * | 8/2006 | de Janasz | G06Q 20/12 705/72 |
| 2006/0191996 A1 | * | 8/2006 | Drummond | G06Q 20/327 235/379 |

(Continued)

*Primary Examiner* — Daniel I Walsh
(74) *Attorney, Agent, or Firm* — Foley & Lardner LLP

(57) ABSTRACT

Methods and systems for completing financial operations via a contactless automated teller machine are disclosed. A financial institution computing system includes a network interface circuit exchanging information over a network, a customer database retrievably storing financial information relating to a plurality of customers, and a data exchange circuit. The data exchange circuit receives a financial operation request. The financial operation request is generated by an automated teller machine in response to a payment token received from a mobile wallet circuit on a mobile device. The data exchange circuit authorizes the financial operation request based on information in the customer database.

19 Claims, 4 Drawing Sheets

(56) References Cited

U.S. PATENT DOCUMENTS

| | | | |
|---|---|---|---|
| 2006/0206709 A1* | 9/2006 | Labrou | G06Q 20/18 713/167 |
| 2006/0242404 A1* | 10/2006 | Su | G06Q 20/027 713/150 |
| 2007/0033397 A1* | 2/2007 | Phillips, II | H04L 63/045 713/168 |
| 2007/0192178 A1* | 8/2007 | Fung | G06Q 20/06 705/14.27 |
| 2007/0295810 A1 | 12/2007 | Hopt et al. | |
| 2008/0109375 A1* | 5/2008 | Ricci | G01S 5/0027 705/76 |
| 2008/0296377 A1 | 12/2008 | Hopt et al. | |
| 2009/0302109 A1 | 12/2009 | Kerner et al. | |
| 2011/0191237 A1* | 8/2011 | Faith | G06F 1/1694 705/39 |
| 2011/0220714 A1* | 9/2011 | Drummond | G06K 7/0004 235/379 |
| 2011/0238573 A1* | 9/2011 | Varadarajan | G06Q 20/1085 705/43 |
| 2012/0047070 A1* | 2/2012 | Pharris | G06Q 20/108 705/43 |
| 2012/0197797 A1* | 8/2012 | Grigg | G06Q 20/1085 705/43 |
| 2012/0197798 A1* | 8/2012 | Grigg | G06Q 20/1085 705/43 |
| 2012/0239570 A1* | 9/2012 | Wolfs | G06Q 20/3223 705/43 |
| 2012/0239572 A1* | 9/2012 | Wolfs | G06Q 20/20 705/44 |
| 2012/0239577 A1* | 9/2012 | Wolfs | G06Q 20/32 705/64 |
| 2012/0239579 A1* | 9/2012 | Wolfs | G06Q 20/18 705/72 |
| 2013/0124411 A1* | 5/2013 | Kobres | G06Q 40/02 705/43 |
| 2013/0226799 A1* | 8/2013 | Raj | G07C 9/00 705/44 |
| 2013/0238488 A1* | 9/2013 | Bouey | G06Q 20/405 705/39 |
| 2013/0246258 A1* | 9/2013 | Dessert | G06Q 20/40 705/41 |
| 2013/0282588 A1* | 10/2013 | Hruska | G06Q 20/10 705/67 |
| 2014/0358777 A1* | 12/2014 | Gueh | G06Q 20/3223 705/43 |
| 2015/0199681 A1* | 7/2015 | Salgado | G06Q 20/382 705/70 |
| 2015/0242662 A1 | 8/2015 | Claessen | |
| 2015/0254647 A1* | 9/2015 | Bondesen | G06Q 20/36 705/41 |
| 2016/0028550 A1* | 1/2016 | Gaddam | H04L 9/3263 713/173 |
| 2017/0161741 A1* | 6/2017 | Ross | G06Q 20/02 |
| 2017/0200150 A1* | 7/2017 | Cohn | G06Q 20/363 |
| 2017/0200155 A1* | 7/2017 | Fourez | G06Q 20/3829 |
| 2017/0213055 A1 | 7/2017 | Hopt | |
| 2017/0300909 A1* | 10/2017 | Bansal | G06Q 20/3821 |
| 2017/0344975 A1* | 11/2017 | Loesch | G06Q 20/1085 |
| 2017/0357965 A1* | 12/2017 | Knopp | G06Q 20/3674 |
| 2018/0068297 A1* | 3/2018 | Goodman | G06Q 40/02 |
| 2018/0225666 A1* | 8/2018 | Khan | G06Q 20/20 |
| 2018/0300991 A1* | 10/2018 | Park | G06Q 40/02 |
| 2018/0336376 A1 | 11/2018 | Pavageau et al. | |
| 2018/0349881 A1* | 12/2018 | Steele | G06Q 20/3223 |
| 2019/0207754 A1* | 7/2019 | Iyer | H04L 9/085 |

\* cited by examiner

SYSTEMS AND METHODS FOR FINANCIAL OPERATIONS PERFORMED AT A CONTACTLESS ATM

CROSS-REFERENCE TO RELATED APPLICATIONS

This application claims priority to U.S. Provisional Patent Application No. 62/257,519, entitled "SYSTEMS AND METHODS FOR FINANCIAL OPERATIONS PERFORMED AT A CONTACTLESS ATM," by Thomas et al., filed on Nov. 19, 2015, which is herein incorporated by reference in its entirety and for all purposes.

BACKGROUND

Various types of personal and financial information are provided to financial institution customers in the form of physical cards and fobs. For example, customers are commonly issued plastic cards corresponding to various accounts at a financial institution, such as a debit card for a checking account. Where a given customer maintains multiple accounts at multiple entities, the customer often accumulates a number of cards that may be difficult to manage, or may even become lost or stolen.

SUMMARY

One embodiment relates to a financial institution computing system. The system includes a network interface circuit enabling the financial institution computing system to exchange information over a network. The system further includes a customer database retrievably storing information relating to a plurality of customers and at least one financial account for each of the plurality of customers. The system includes a data exchange circuit communicatively engaged to the network interface circuit and the customer database. The data exchange circuit receives a financial operation request including detokenized account information from the network interface circuit, wherein the financial operation request is generated by an automated teller machine in response to a payment token received from a mobile wallet circuit on a mobile device. The data exchange circuit authorizes the financial operation request based on information in the customer database.

Another embodiment relates to an automated teller machine. The automated teller machine includes a network interface circuit, an input/output device, and an automated teller machine circuit. The network interface circuit enables the automated teller machine to exchange information over a network. The input/output device is configured to exchange data with a mobile wallet circuit on a mobile device. The automated teller machine circuit is communicatively engaged to the network interface circuit and the input/output device. The automated teller machine circuit receives a payment token from the mobile wallet circuit through the input/output device. The automated teller machine circuit further generates and transmits a financial operation request including the payment token and a customer selected financial operation request over the network. The automated teller machine circuit receives a request authorization from the network, wherein the request authorization prompts the automated teller machine to complete the customer selected financial operation.

Yet another embodiment relates to a method of completing financial operations at an automated teller machine. The method includes receiving, by a data exchange circuit at a financial institution computing system, a financial operation request including detokenized account information from a network interface circuit accessing a network, wherein the financial operation request is generated by the automated teller machine in response to a payment token received from a mobile wallet circuit on a mobile device. The method further includes authorizing, by the data exchange circuit, the financial operation request based on information in a customer database retrievably storing information relating to a plurality of customers and at least one financial account for each of the plurality of customers. The method includes transmitting, by the data exchange circuit via the network interface circuit, a request authorization to the automated teller machine, wherein the automated teller machine performs a requested financial operation in response to the request authorization.

DETAILED DESCRIPTION

Figure 1:
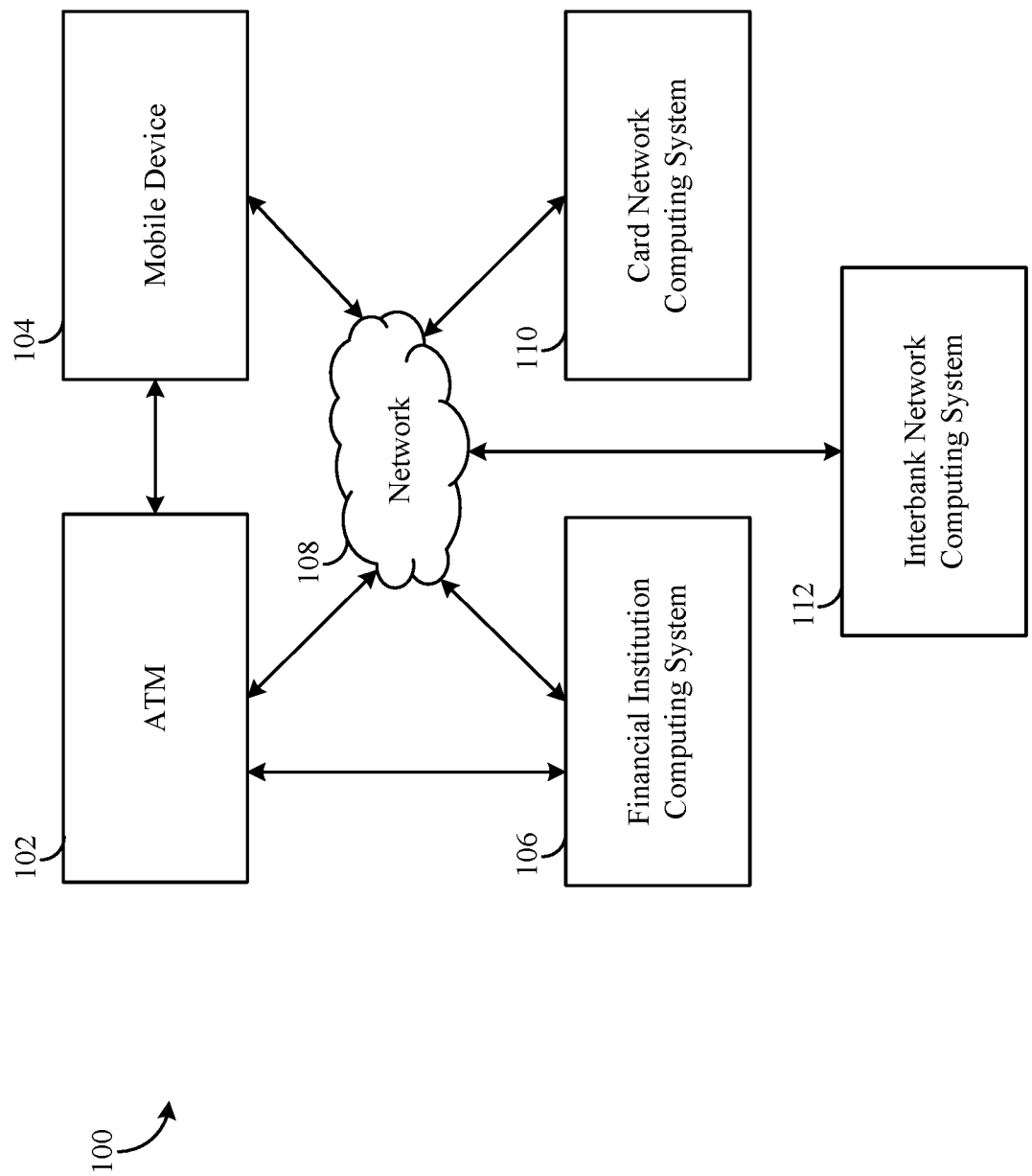
FIG. 1 is a block diagram illustrating a financial transaction system incorporating a contactless ATM, according to an example embodiment.

In example embodiments, a contactless automated teller machine ("ATM") system 100 uses payment card tokens to facilitate customer financial operations performed at ATMs. Payment card tokens are surrogate values that replace the primary account number ("PAN") associated with a payment card, such as a credit card, debit card, ATM card, stored value card, etc. Payment card tokens can pass basic validation rules of an account number. Hence, in the case of a debit card, the payment card token for a given debit card "looks like" a real debit card number (e.g., a sixteen-digit number), but in fact is only a token. As part of a token generation process, steps are taken such that the generated payment card token does not have the same value as or otherwise conflicts with a real PAN (e.g., a real debit card number). A given payment card token may be provisioned to various locations for use in various types of scenarios, including ATMs for performing various financial operations, storage at a mobile device (e.g., a smartphone) for in-person or on-line transactions with a merchant, and so on.

In example embodiments, to process financial operations at an ATM, an operation is processed using a mobile device and a payment card token stored in the mobile device in lieu of a payment card and a PAN (e.g., the 16-digit account number stored in a magnetic strip on the payment card). The ATM obtains the payment card token from the mobile device. The payment card token is detokenized in order to allow for the completion of an operation. Detokenization refers to the process of replacing a payment token for its associated PAN value based on the payment token-to-PAN mapping information stored in a token database, which is sometimes referred as a "token vault". The token database may also maintain other information that may be used to apply restrictions or other controls during transaction processing.

Payment tokens corresponding to a plurality of PANs may be collected, stored, and exchanged by a mobile wallet application on a customer mobile device. A customer may use the mobile wallet application to organize and use various forms of payment. For example, a customer may open a mobile wallet account via the mobile wallet application, and cause payment tokens corresponding to a plurality of accounts to be stored on the mobile device. Payment tokens may be provided to the mobile device by, for example, wireless transmissions (e.g., radio frequency transmissions, such as NFC) between a given payment card and the mobile device. A card network computing system (e.g., associated with VISA®) may also provision payment tokens to the mobile device over a network (e.g., over the Internet).

In example embodiments, processing operations using such payment card tokens provides enhanced security in connection with the operations. The payment card tokens may be limited to use (e.g., only in connection with a specific entity such as a merchant, only in connection with ATMs, only in connection with a mobile device of a customer, etc.). In the event of a security breach at a given computing system, the risk of subsequent fraud is reduced because only the payment card tokens are exposed, which cannot be used by unauthorized entities. That is, a fraudster would not be able to use a customer payment token to perform transactions (e.g., because the fraudster is not using the mobile device of the customer, because the fraudster is attempting a non-ATM transaction, etc.).

Referring to FIG. 1, a contactless ATM system 100 includes an ATM 102, a mobile device 104, a financial institution computing system 106, a card network computing system 110, and an interbank network computing system 112. The financial institution computing system 106 is a computing system at a financial institution that is capable of maintaining customer accounts (e.g., payment card accounts) and databases of customer information. In the context of the present disclosure, the financial institution can include commercial or private banks, credit unions, investment brokerages, or the like.

The card network computing system 110 is a computing system associated with a card network. Examples of card networks include Visa®, MasterCard®, etc. The card network computing system 110 performs operations associated with the generation and issuance of payment card tokens, and maintains the established mapping of payment card tokens-to-PANs in a token database (e.g., a token vault). The card network computing system 110 is also configured to detokenize payment card tokens to process various transactions.

The interbank network computing system 112 is a computing system associated with one or more interbank networks (e.g., Maestro, NYCE, PLUS, Cirrus, STAR, etc.). An interbank network includes a plurality of member financial institutions. The interbank computing system 112 enables customers of a first interbank network member to perform ATM transactions at an ATM owned or operated by a second interbank network member. Further, the interbank network computing system 112 enables customers to use an independently owned ATM (i.e., not owned or operated by a financial institution) to perform ATM transactions with interbank network members. For example, a customer may use an independently owned ATM to request a withdrawal from an account held at the financial institution computing system 106. The ATM may interface with the interbank network computing system 112, and the interbank network computing system 112 may route the request to the financial institution computing system 106. The financial institution computing system 106 may inform the interbank network computing system 112 that the customer has sufficient funds for the requested withdrawal, and authorize the ATM 102 to dispense cash to the customer against the customer account.

The ATM 102 is a computing system configured to provide an interface between a customer and the financial institution computing system 106, allowing the customer to access information at and perform transactions with the corresponding financial institution. For example, the ATM 102 may be configured to allow a customer to view financial account balances, deposit checks, transfer funds, or withdraw funds from a given account in the form of cash. The ATM 102 may be disposed at a brick and mortar banking facility associated with the financial institution, or may be a standalone computing terminal (e.g., disposed at an unrelated retail facility, within an office building, etc.). The ATM 102 includes hardware and associated logics enabling contactless data transfers, for example, using radio frequency identification ("RFID") and/or near-field communication ("NFC").

The mobile device 104 is a computing system associated with a customer of the financial institution. The mobile device 104 is configured to allow the mobile device 104 to execute software applications (e.g., the mobile wallet application), access websites, generate graphical user interfaces, receive various inputs, generate various outputs, and perform other similar operations. Examples of the mobile device 104 include smartphones, tablets, wearable computing devices such as eyewear and watches, and so on. In addition, the mobile device 104 includes hardware and associated logics enabling contactless data transfer processes that are compatible with the ATM 102.

A network 108 enables the components of the system 100 to communicate with each other (i.e., the ATM 102, the mobile device 104, the financial institution computing system 106, the card network computing system 110, and the interbank network computing system 112). The network 108 is a data exchange medium, which may include wireless networks (e.g., cellular networks, Bluetooth®, WiFi, Zigbee®, etc.), wired networks (e.g., Ethernet, DSL, cable, fiber-based, etc.), or a combination thereof. In some arrangements, the network 108 includes the internet. In some arrangements, the network 108 includes a proprietary network between the ATM 102 and the financial institution computing system 106 (e.g., where the financial institution owns and/or operates the ATM 102). In other arrangements, the network 108 includes a communication medium allowing the ATM 102 to communicate with third parties (e.g., the interbank network computing system 112, the financial institution computing system 106, etc.).

In operation, the system allows a customer to securely access information at and perform transactions with the financial institution through the ATM 102 using the mobile device 104 in lieu of a physical payment card (e.g., an ATM card, a debit card, etc.). A payment token stored in a mobile wallet application on the mobile device 104 serves as a substitute for the payment card. As such, the payment token can be used to identify the customer, identify accounts at the financial institution associated with the customer, and authenticate the customer's access to the accounts.

In one arrangement, a customer downloads and installs a mobile wallet application on the mobile device 104. The customer then uses the mobile wallet application to cause a payment token corresponding to a financial account to be disposed in the mobile device 104 (e.g., from a chip on a payment card, from the car network computing system 110 over the network 108, etc.). The customer walks up to the ATM 102, selects the payment token via the mobile wallet application, and causes the mobile device 104 to transfer the payment token to the ATM 102. Transferring the token may be accomplished through complementary contactless data transfer devices at the ATM 102 and the mobile device 104. For example, an NFC device on the mobile device 104 can be used to wirelessly transfer the token to a receiving NFC device at the ATM 102. In some arrangements, the transmission of the payment token "wakes up" the ATM 102 from a sleep or standby mode (e.g., where a display at the ATM 102 passively displays a screensaver or a welcome or instruction screen). The ATM 102 may further request additional authentication information such as a personal identification number ("PIN"), which the customer may enter on a numerical keypad. In some arrangements, the PIN is simultaneously transmitted with the payment token to the ATM 102 (e.g., where the customer selects a payment card and provides the PIN to the mobile device 104, and the mobile device 104 transmits the token and PIN to the ATM 102).

In some arrangements, the ATM 102 may use the payment token to assemble a zero or negligible value transaction request (e.g., $0.00, $0.01, etc.) in order to identify the customer financial account and the financial institution corresponding to the payment token. The transaction request may be assembled such that it resembles a standard payment transaction (e.g., a purchase of $0.00, with the payment token as the method of payment) from a point of sale (e.g., at a retail terminal). In one arrangement, the transaction request includes the payment token and an ATM identifier (an "ATM ID"). The ATM ID is a code sufficient to identify the specific ATM 102 being used by the customer, and may be included in the transaction request. In one such an arrangement, the ATM 102 transmits the transaction request to the card network computing system 110. The card network computing system 110 treats the transaction request as a normal transaction, detokenizing the payment token to reveal the corresponding PAN. The card network computing system 110 provides the PAN to the financial institution computing system 112, which identifies the customer account and the customer, and enables further transactions at the ATM 102.

In other arrangements, the ATM 102 is not configured to generate zero or negligible value transaction requests. In one arrangement, where the ATM 102 is not associated with the financial institution that issued the payment card corresponding to the payment token, the ATM 102 generates a standard ATM transaction request, which is received by the card network computing system 110 over the network 108. The card network computing system 110 detokenizes the payment card token to reveal a PAN, which is transmitted to the interbank network computing system 112. The interbank network computing system 112 transmits the PAN and the ATM transaction request to the financial institution computing system 106, which authenticates and authorizes the transaction request. The financial institution computing system 106 transmits the approval back downstream (e.g., to the interbank network computing system 112, to the card network computing system 110, and to the ATM 102), and customer may then complete one or more ATM transactions. Additional details and functions of the system 100 are discussed below.

Figure 2:
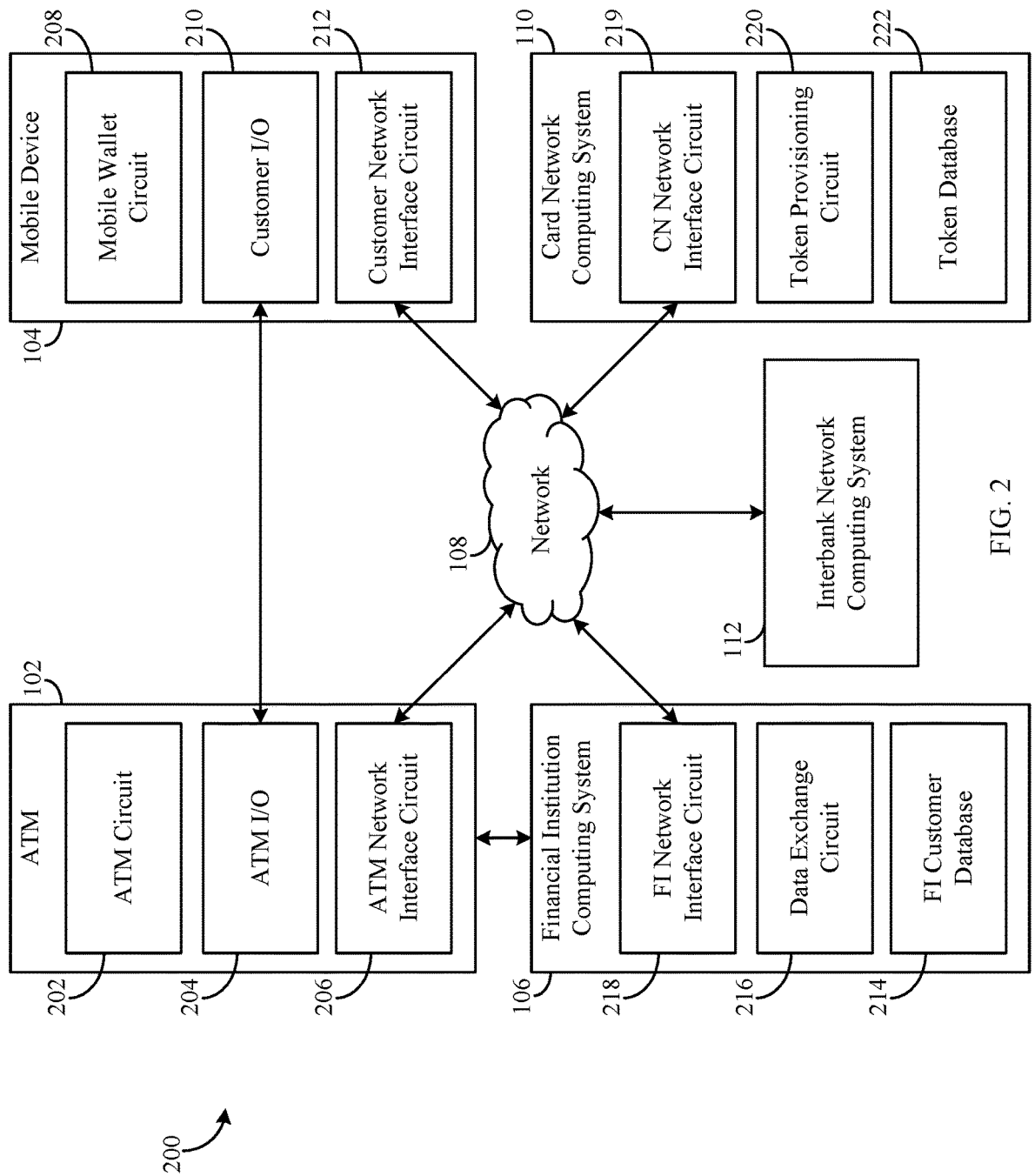
FIG. 2 is a block diagram illustrating additional features of the financial transaction system shown in FIG. 1.

Referring now to FIG. 2, a more detailed system 200 illustrating example embodiments of the components of the system 100 is shown. The ATM 102 includes an ATM circuit 202, an ATM input and output device ("I/O") 204, and an ATM network interface circuit 206.

As used herein, the term "circuit" may include hardware structured to execute the functions as described. In some embodiments, each respective "circuit" may include software for configuring the hardware to execute the functions described herein. The circuit may be embodied as one or more circuitry components including, but not limited to, processing circuitry, storage media, network interfaces, peripheral devices, input devices, output devices, sensors, etc. In some embodiments, a circuit may take the form of one or more analog circuits, electronic circuits (e.g., integrated circuits (IC), discrete circuits, system on a chip (SOCs) circuits, etc.), telecommunication circuit, hybrid circuit, and any other type of "circuit." In this regard, the "circuit" may include any type of component for accomplishing or facilitating achievement of the operations described herein. For example, a circuit as described herein may include one or more transistors, logic gates (e.g., NAND, AND, NOR, OR, XOR, NOT, XNOR, etc.), resistors, multiplexers, registers, capacitors, inductors, diodes, wiring, and so on).

A given "circuit" may also include one or more processors communicatively coupled to a memory. In this regard, the one or more processors may execute instructions stored in memory or may execute instructions otherwise accessible to the one or more processors. In some embodiments, the one or more processors may be embodied in various ways. The one or more processors may be constructed in a manner sufficient to perform at least the operations described herein. In some embodiments, the one or more processors may be shared by multiple circuits (e.g., circuit A and circuit B may comprise or otherwise share the same processor which, in some example embodiments, may execute instructions stored, or otherwise accessed, via different areas of memory). Alternatively or additionally, the one or more processors may be structured to perform or otherwise execute independent of one or more co-processors. In other example embodiments, two or more processors may be coupled via a bus to enable independent, parallel, pipelined, or multi-threaded instruction execution. Each processor may be implemented as one or more general-purpose processors, application specific integrated circuits (ASICs), field programmable gate arrays (FPGAs), digital signal processors (DSPs), or other suitable electronic data processing components structured to execute instructions provided by memory. The one or more processors may take the form of a single core processor, multi-core processor (e.g., a dual core processor, triple core processor, quad core processor, etc.), microprocessor, etc. In some embodiments, the one or more processors may be external to the apparatus, for example the one or more processors may be a remote processor (e.g., a cloud based processor). Alternatively or additionally, the one or more processors may be internal and/or local to the apparatus.

Each memory device discussed herein may include non-transient volatile storage media, non-volatile storage media, non-transitory storage media (e.g., one or more volatile and/or non-volatile memories), etc. In some embodiments, the non-volatile media may take the form of ROM, flash memory (e.g., flash memory such as NAND, 3D NAND, NOR, 3D NOR, etc.), EEPROM, MRAM, magnetic storage, hard discs, optical discs, etc. In other embodiments, the volatile storage media may take the form of RAM, TRAM, ZRAM, etc. Each respective memory may be operable to maintain or otherwise store information relating to the operations performed by one or more associated circuits, including processor instructions and related data (e.g., database components, object code components, script components, etc.), in accordance with the example embodiments described herein.

Based on the operations described herein with respect to each circuit, a given circuit may further be communicatively coupled to one or more other components, for example other circuits, input devices (e.g., devices providing incoming data to be processed by the circuit), output devices (e.g., devices receiving and acting upon data processed by the circuit), or intermediary devices (e.g., routing data to or from other components). In addition, a given circuit or components thereof may be disposed locally (e.g., as part of a local server, a local computing system, etc.) or remotely (e.g., as part of a remote server such as a cloud based server). To that end, a "circuit" as described herein may include components that are distributed across one or more locations.

With respect to the ATM circuit 202, the ATM circuit 202 is a circuit configured to enable a customer to interface with the financial institution computing system 106. The ATM circuit 202 exchanges information between a customer via the mobile device 104, the financial institution computing system 106, the card network computing system 110, and the interbank network computing system 112 to perform various financial operations. For example, the ATM circuit 202 may be configured to collect authentication information (e.g., a token and a PIN) from the mobile device 104, and send the authentication information to the financial institution computing system 106, the card network computing system 110, and/or the interbank network computing system 112 over the network 108. Further, the ATM circuit 202 may be configured to receive an authentication confirmation from the financial institution computing system 106 and allow the customer to create financial operation requests. Such financial operation requests may include, for example, balance inquiries, check deposit requests, cash withdrawal requests, and so on. The ATM circuit 202 assembles and transmits a customer's desired financial operation request to the financial institution computing system 106, which executes the corresponding financial operation. In some arrangements, the ATM circuit 202 ultimately provides the customer with a requested amount of cash. In other arrangements, the ATM circuit 202 ultimately provides the customer with requested financial information (e.g., an account balance). As one of skill in the art would recognize, the ATM circuit 202 may provide the customer with various types of outputs corresponding to information exchanged with the financial institution computing system 106.

The ATM I/O 204 includes one or more devices and associated logics configured to allow a customer to exchange information and interact with the ATM circuit 202. For example, an input aspect of the ATM I/O 204 can include a magstripe reader, a keyboard, a touchscreen, a microphone, a camera, a fingerprint scanner, any user input device engageable to the ATM 102 via a USB, serial cable, and so on. In turn, an output aspect of the ATM I/O 204 can include a digital display, a speaker, illuminating icons, LEDs, a cash dispenser, a paper (e.g., receipts) dispenser, and so on. In addition, the input aspect and the output aspect of the ATM I/O 204 includes a contactless data transmission device. The contactless transmission device includes hardware and associated software sufficient to enable the ATM 102 to wirelessly and securely exchange data over short distances (e.g., within a range of a few inches or less). In some arrangements, the contactless device is configured to use RFID to exchange digital information. In some such arrangements, the contactless device enables the ATM 102 to exchange data over a radio frequency range required for NFC. As such, the ATM I/O 204 can wirelessly send and receive data (e.g., a token) at a local level (i.e., where a customer is physically present at the ATM 102).

The ATM network interface circuit 206 enables the ATM 102 to exchange data over the network 108. As such, the ATM network interface circuit 206 allows the ATM 102 to exchange data to remote computing devices (e.g., the financial institution computing system 106, the card network computing system 110, etc.).

The mobile device 104 includes a mobile wallet circuit 208, a customer input and output device ("I/O") 210, and a customer network interface circuit 212. Similar to the ATM network interface circuit 206, the customer network interface circuit 212 enables the mobile device 104 to exchange data over the network 108. For example, the customer network interface circuit 212 allows the mobile device 104 to exchange data to remote computing devices such as the financial institution computing system 106.

The customer I/O 210 includes hardware and associated logics configured to enable a customer and the ATM 102 to exchange information with the mobile device 104. An input aspect of the customer I/O 210 allows the customer to provide information to the mobile device 104, and can include, for example, a keyboard, a touchscreen, a microphone, a camera, a fingerprint scanner, any user input device engageable to the mobile device 104 via USB, and so on. In turn, an output aspect of the customer I/O 210 allows the customer to receive information from the mobile device 104, and can include, for example, a digital display, a speaker, illuminating icons, LEDs, and so on. The customer I/O 210 also includes a contactless data transmission device that operates in a manner similar to and compatible with the ATM I/O 204.

In addition to various merchant terminals, online marketplaces, etc., the mobile wallet circuit 208 may exchange information with the ATM 102 to complete one or more financial transactions. In some arrangements, the mobile wallet circuit 208 includes software issued by or on behalf of the financial institution (e.g., a software application, or an "app"). In other arrangements, the mobile wallet circuit includes software issued by on or on behalf of a third party wallet provider (e.g., Apple Pay™ or Google Wallet™).

The mobile wallet circuit 208 may be used by an individual user (e.g., a business owner or employee, a consumer, etc.) to create and interact with a mobile wallet account. While setting up a mobile wallet account, the mobile wallet circuit 208 may receive, organize, and store payment tokens from payment cards and/or the card network computing system 110. The mobile wallet circuit 208 may then transmit certain payment tokens to ATM 102 (e.g., via the customer I/O 210) as part of any of a variety of transaction requests to complete various financial operations. For example, the mobile wallet circuit 208 may receive and display screens on the customer I/O 210 including account information, transaction instructions, and so on. In one embodiment, a screen may be used to request a username, password, and PIN information from the user, as well as information sufficient to identify a target account (e.g., to identify a payment token) and a desired transaction type (e.g., a withdrawal).

In one arrangement, a token is provided to the mobile device 104 over the network 108 after the customer creates the mobile wallet circuit 208 (e.g., provisioned by the card network computer system 110, and sent by the financial institution computing system 106 or the card networking computing system 110). In one such an arrangement, the customer registers the mobile device 104 with the financial institution, for example, creating a username and password to be associated with the customer on the mobile wallet.

In another arrangement, the token is received from a physical payment card provisioned by the card network computing system 110. For example, the card network computing system 110 may cause a physical payment card to be issued that includes a chip housing a secure data storage device. The chip may include the token in the data storage device, and the chip may also be configured to exchange data with a contactless data transmission device (e.g., the customer I/O 210). In one such arrangement, the customer may create the mobile wallet circuit 208 on the mobile device 104, and transfer a copy of the token from the payment card to the mobile wallet circuit 208 via the customer I/O 210. As one of skill in the art would recognize, other approaches to disposing the token on the mobile wallet circuit 208 are possible.

In some arrangements, the mobile wallet circuit 208 is configured to encrypt some or all of outgoing data transmissions that include a token. A unique encryption key may be stored at the mobile device 104, which in some arrangements operates in conjunction with an encryption algorithm and is specific to the mobile device 104. In some arrangements, the unique encryption key is used to create a new cryptogram for each data transmission. A master encryption key may maintained at the card network computing system 110, which may be used to decrypt cryptograms transmitted by a plurality of mobile wallet circuits. The master encryption key may also be used to verify that a given cryptogram was encrypted properly by the unique encryption key assigned to the mobile device 104 used to create a given transaction request. According to various arrangements, the encryption keys may be provisioned by any of a mobile wallet provider, the financial institution computing system 106, or the card network computing system 110.

The card network computing system 110 includes a CN network interface circuit 219, a token provisioning circuit 220, and a token database 222. The CN network interface circuit 219 enables the card network computing system 110 to exchange data over the network 108. As such, the CN network interface circuit 219 allows the card network computing system 110 to exchange data to remote computing devices (e.g., the financial institution computing system 106, the mobile device 104, the interbank network computing system 112, etc.).

The token database 222 is a storage medium retrievably storing token information (e.g., a token vault), and may include non-transient data storage mediums (e.g., local disc or flash-based hard drives, local network servers, and the like) or remote data storage facilities (e.g., cloud servers).

The token provisioning circuit 220 is configured to provision and manage tokens. In one aspect, the token provisioning circuit 220 can generate a new unique code to be provisioned as a token, and associate the token with a PAN. Hence, in some embodiments, payment card tokens are generated by the card network computing system 110, and payment token-to-PAN mapping information is maintained by the card network computing system 110. In another aspect, the token provisioning circuit 220 may be able to replace tokens as well as activate and deactivate tokens. The token provisioning circuit 220 may also be configured to associate permissions with each token, thereby allowing or disallowing the transmission or use of data associated with a given token.

For example, a financial institution may assign a PAN to a customer opening a new financial account, specifically identifying that new account (e.g., a sixteen-digit account number for a payment card associated with the account). In addition, after the customer sets up the mobile wallet circuit 208 on the mobile device 104, the card network computing system 110 may assign a payment token corresponding to the PAN and the mobile wallet circuit 208. In other words, the payment token can be used to identify the PAN and the mobile wallet circuit 208. The PAN, the payment token, and information relating to their respective associations may be stored in the token database 222, and in some arrangements, the FI customer database 214 as well.

The token provisioning circuit 220 may also be configured to maintain and use one or more master encryption keys to decrypt incoming transaction requests. For example, the token provisioning circuit 220 may receive a cryptogram over the network 108 via the CN network interface circuit 219. In one such an arrangement, the cryptogram was created using a unique encryption key properly assigned to the mobile device 104. The token provisioning circuit 220 may decrypt and unpack the cryptogram with the master encryption key, revealing an authentication code (e.g., a stored code associated with the mobile device 104 and/or an authorized user of a subject financial account). The token provisioning circuit 220 may confirm that the cryptogram was made with a properly issued unique encryption key (e.g., whether the decrypted authentication code matches a stored authentication code), retrieve the PAN corresponding to the payment token, and transmit the results to the financial institution computing system 106 (or the card network computing system 110, as appropriate).

In the expanded system 200, the financial institution computing system 106 includes a FI customer database 214, a data exchange circuit 216, and an FI network interface circuit 218. The FI network interface circuit 218 is configured to allow the financial institution computing system 106 and the various components therein to exchange data over the network 108 (e.g., with the ATM 102, the mobile device 104, the card network computing system 110, and/or the interbank network computing system 112).

The FI customer database 214 allows the financial institution computing system 106 to retrievably store customer information relating to the various operations discussed herein, and may include non-transient data storage mediums (e.g., local disc or flash-based hard drives, local network servers, and the like) or remote data storage facilities (e.g., cloud servers). The FI customer database 214 includes personal customer information (e.g., names, addresses, phone numbers, and so on), identification information (e.g., PINs, social security numbers, driver's license numbers, biometric data, and so on), and customer financial information (e.g., account numbers, account balances, token information, available credit, credit history, transaction histories, and so on).

The payment token-to-PAN mapping information generated and stored at the card network computing system 110 may also be maintained by the FI customer database 214 at the financial institution computing system 106. As such, for example, the financial institution computing system 106 may provide additional token-related management services to customers that are not available through the card network computing system 110. Such services may be useful in situations where customers have multiple different types of accounts (e.g., multiple different types of credit cards, such that a single card network computer system does not have a global view of all of the payment tokens in existence for a given customer). Such services may be useful in situations where other information in addition to account numbers is tokenized by the financial institution computing system 106 or other computing systems, thereby creating tokens that are not payment tokens.

The data exchange circuit 216 is configured to exchange data among the FI customer database 214, the ATM 102, the mobile device 104, the card network computing system 110, and the interbank network computing system 112. In one aspect, the data exchange circuit 216 may be configured to exchange tokens and permissions with the card network computing system 110, the interbank network computing system 112, and the ATM 102 (e.g., for authentication purposes) and the mobile device 104 (e.g., for the mobile wallet). The data exchange circuit 216 may also be configured to facilitate transactions involving the ATM 102 and the mobile device 104. In one arrangement, the data exchange circuit 216 provides software sufficient to enable the mobile wallet circuit 208 on the mobile device 104. Further, in some arrangements, the data exchange circuit 216 provides a payment token from the card network computing system 110 to the mobile wallet circuit 208 over the network 108. The data exchange circuit 216 is also configured to cooperate with other components of the financial institution computing system 106 to authenticate and authorize various requests received from the ATM 102.

In operation, in one arrangement, a customer sets up the mobile wallet circuit 208 on the mobile device 104, establishing a mobile wallet. In some arrangements, a unique encryption key is assigned and maintained at the mobile wallet circuit 208 as well. The mobile wallet circuit 208 receives a payment token corresponding to a customer account over the network 108 (e.g., from the financial institution computing system 106 or the card network computing system 110 via the customer network interface circuit 212). The customer approaches the ATM 102 and allows the mobile wallet circuit 208 to communicate with the ATM circuit 202 via the customer I/O 210 and the ATM I/O 204, respectively. For example, the communication may occur via an NFC data transmission, which may include an ATM transaction request (e.g., for a balance inquiry) and a cryptogram (e.g., an encrypted authentication code). The ATM circuit 202 may request a second layer of authentication information from the customer, for example a PIN, via the ATM I/O 204. The customer may then enter a four digit PIN into the ATM I/O 204 (e.g., via a numerical keypad).

The ATM circuit 202 then processes the ATM transaction request. In one arrangement, the ATM circuit 202 also generates a payment transaction request involving a negligible or zero amount of funds (e.g., a withdrawal of $0.00). In such an arrangement, downstream computing systems (e.g., card network computing system 110, the financial institution computing system 106, etc.) can process the payment transaction request as normal (e.g., similar to transaction requests generated by point of sale terminals). In some arrangements, the payment transaction request includes an ATM ID. For example, the ATM circuit 202 may transmit a zero dollar payment transaction request and the cryptogram to the card network computing system 110 over the network 108. The card network computing system 110 may decrypt and validate the cryptogram (e.g., via a master encryption key), and detokenize the payment token. The card network computing system 110 may then transmit the resulting PAN and the zero dollar payment transaction request to the financial institution computing system 106. The financial institution computing system 106 may then identify the customer and the customer account via the PAN, and the ATM 102 via the ATM ID. For example, where the ATM 102 is associated with the financial institution computing system 106 (e.g., both are operated by the same issuer), the financial institution computing system 106 may interface with the ATM 102 over the network 108 or over a proprietary network. The customer may then complete one or more ATM transactions at the ATM 102 (e.g., a cash withdrawal).

In another arrangement, the ATM 102 and the financial institution computing system 106 are each associated with the same financial institution. In such an arrangement, the ATM recognizes a received token as belonging to a card issued by the financial institution, and thus, the token does not need to be sent through the payment network to the card network computing system 112 with a negligible or zero to retrieve the subject financial account. Instead, the ATM circuit 202 transmits the ATM transaction request (e.g., including a token and a cryptogram) to the financial institution computing system 106 directly (e.g., over the network 108 or via a local data network, bypassing the card network computing system 110 and/or the interbank network computing system 112). The data exchange circuit 216 may detokenize the token to identify a subject financial account (e.g., using token information stored in the FI customer database 214). In some arrangements, the data exchange circuit 216 may send the cryptogram out for decryption (e.g., to the card network computing system 110 via the network 108) to authenticate the ATM transaction request. In other arrangements, the data exchange circuit 216 may ignore the cryptogram and authenticate the ATM transaction request with other types of customer information (e.g., a PIN entered at the ATM I/O 204). Upon authenticating the ATM transaction request, the data exchange circuit 216 may authorize the requested transaction to occur at the ATM 102.

In yet another arrangement, the ATM 202 processes the authentication request through standard ATM networks. The ATM circuit 202 may transmit the ATM transaction request and the cryptogram to the card network computing system 110. The card network computing system 110 decrypts the cryptogram and detokenizes the payment card token, and passes the resulting PAN and the ATM transaction request on to the interbank network computing system 112. The interbank network computing system 112 identifies the financial institution computing system 106, and routes the PAN and the ATM transaction request to the financial institution computing system 106. The financial institution computing system 106 authenticates and authorizes the ATM transaction request with respect to the PAN, and transmits an appropriate response (e.g., results of a balance inquiry) back upstream to the ATM 102.

Figure 3:
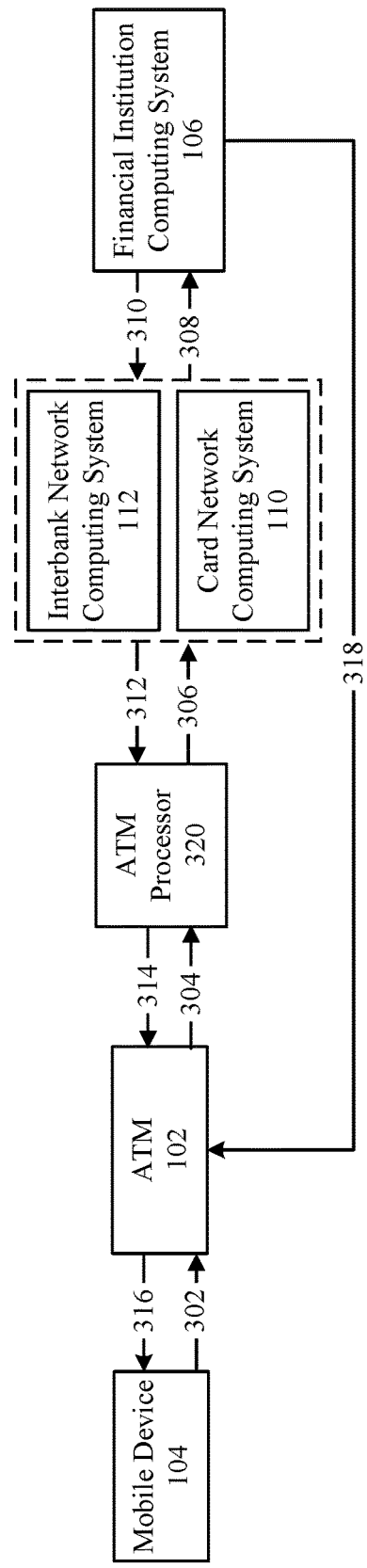
FIG. 3 is a flowchart of a mobile wallet transaction process, according to an example embodiment.

FIG. 3 illustrates a process 300 that may be implemented by the system of FIGS. 1-2. By way of example, FIG. 3 shows a mobile wallet transaction. When a user wishes to transact with the ATM 102, for example, the user may access the mobile wallet circuit 208 by entering a PIN or other login credentials and then selecting a "transact" or similar button via the customer I/O 210. At step 302, the mobile device 104 may transmit a payment token and a cryptogram to the ATM 102 (e.g., via the customer I/O 210, using a QR code, NFC, wireless, Bluetooth, low energy Bluetooth, RFID, hypersonic, Wi-Fi, cellular 3G, 4G, GSM, LiFi, or other method). In some arrangements, at step 316, the ATM 102 provides the mobile device 104 with a confirmation that the payment token was successfully received. The ATM 102 prepares an ATM transaction request (e.g., a cash withdrawal), including the payment token and cryptogram received at 302. In some arrangements, the ATM transaction request includes a zero dollar payment transaction request.

At step 304, the ATM 102 transmits the ATM transaction request to an ATM processor 320. The ATM processor 320 is a networked computing system configured to triage ATM transaction requests prepared by the ATM 102. In some arrangements, the ATM processor 320 is operated by an independent third party associated with the ATM 102 (e.g., where the ATM 102 is owned or operated by a non-issuer entity). In other arrangements, operations discussed with respect to the ATM processor 320 is performed by the financial institution computing system 106 (e.g., where the ATM 102 is owned or operated by the financial institution associated with the financial institution computing system 106). The ATM processor 320 determines the proper card network computing system 110 corresponding to the payment token (e.g., VISA, MasterCard, etc.).

The ATM processor 320 transmits the ATM transaction request to the card network computing system 110 at step 306. The card network computing system 110 decrypts and validates the cryptogram (e.g., via a master decryption key), if any, and detokenizes the payment token. The card network computing system 110 may then forward the resulting PAN and the ATM transaction request to the interbank network computing system 112 to identify the financial institution computing system 106 (e.g., where the ATM 102 is independently owned, or where the ATM 102 is owned by a first financial institution and the payment token corresponds to a payment card issued by a second financial institution).

At 308, the card network computing system 110 or the interbank network computing system 112 transmits the PAN and the ATM transaction request (e.g., including a zero dollar transaction request, if any) to the financial institution computing system 106. The financial institution computing system 106 authenticates the PAN (e.g., verifying that the account is still active, has available funds, is not frozen, etc.). In some arrangements, where the ATM 102 is associated with the financial institution computing system 106 (e.g., by the same issuer financial institution), the financial institution computing system 106 may interface with the ATM 102 at 318. In such arrangements, the financial institution computing system 106 may identify the ATM 102 via an ATM ID included in the ATM transaction request. In other arrangements, the financial institution computing system 106 may authorize one or more transactions in the ATM transaction request (e.g., a balance inquiry, a withdrawal, etc.), and submit a corresponding response back upstream to the ATM 102 (e.g., at 310, 312, and 314).

Upon receiving a response from the financial institution computing system 106, the ATM 102 may provide the user with an appropriate output. For example, the response may prompt one or more logics associated with a cash dispenser of the ATM I/O 204 to collect a requested sum of cash for a withdrawal. The ATM I/O 204 may then make the requested sum of cash available to the user (e.g., opening a dispenser door or drawer). In some embodiments, output may further include a receipt provided by the ATM I/O 204. The ATM I/O 204 may send the receipt to the mobile device 104 electronically, or physically print the receipt at the ATM 102.

Figure 4:
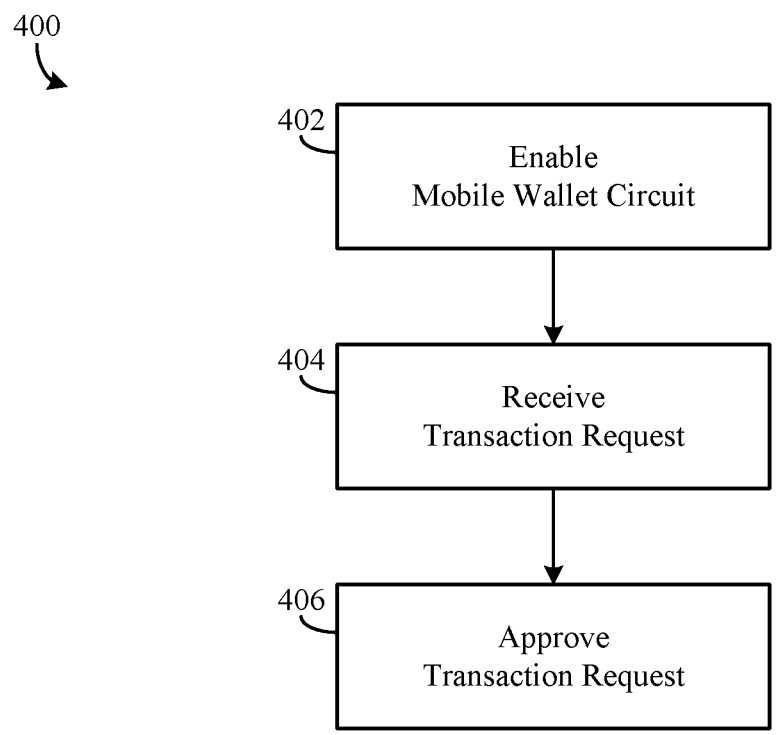
FIG. 4 is a flowchart of a method of completing financial operation requests generated from a contactless ATM, according to an example embodiment.

Referring now to FIG. 4, a method 400 of completing transactions through a contactless ATM is shown. The method 400 is performed by processing and storage hardware at a financial institution computing system (e.g., financial institution computing system 106), as executed by one or more circuits configured to perform the functions described below.

At 402, a mobile wallet circuit (e.g., the mobile wallet circuit 208) is enabled. The mobile wallet circuit may be enabled by a data exchange circuit (e.g., the data exchange circuit 216). In some arrangements, the data exchange circuit enables the mobile wallet circuit by providing software sufficient for the mobile wallet circuit to be assembled on a mobile device (e.g., the mobile device 104). In addition, in some arrangements, the data exchange circuit enables a mobile wallet functionality through the mobile wallet circuit. In other arrangements, the data exchange circuit enables a mobile wallet circuit provided by a third party by maintaining one or more payment card accounts. Such payment card accounts may be tokenized by a card network computing system (e.g., card network computing system 110). The mobile wallet circuit is enabled in a manner sufficient to allow the mobile device to transmit an authentication request and a token to an ATM (e.g., the ATM 102).

At 404, a transaction request is received. The transaction request is received by the data exchange circuit over a network (e.g., the network 108, for example via the FI network interface circuit 218). The transaction request may be received from the card network computing system or an interbank computing system (e.g., the interbank computing system 112). The transaction request includes a request to authenticate financial operations at the ATM relating to one or more accounts held by a customer. In some arrangements, the authentication request includes a PIN. Further, in some arrangements, the authentication request includes a transaction request involving a nominal or zero amount of funds.

The transaction request also includes detokenized information, including a PAN. The detokenized information is sufficient to identify at least one account held by the customer at the financial institution computing system.

At 406, the transaction request is approved. In one arrangement, the data exchange circuit approves the authentication request if a PIN provided with the transaction request matches a known PIN associated with the customer in the FI customer database (e.g., the FI customer database 214). In some arrangements, the data exchange circuit approves the authentication request if the detokenized information received at 404 includes a permission to perform financial operations at the ATM. In one arrangement, if the authentication request is approved, the data exchange circuit transmits the approval back to the ATM (e.g., over the network via the FI network interface circuit).

The scope of this disclosure should be determined by the claims, their legal equivalents and the fact that it fully encompasses other embodiments which may become apparent to those skilled in the art. All structural, electrical and functional equivalents to the elements of the below-described disclosure that are known to those of ordinary skill in the art are expressly incorporated herein by reference and are intended to be encompassed by the present claims. A reference to an element in the singular is not intended to mean one and only one, unless explicitly so stated, but rather it should be construed to mean at least one. No claim element herein is to be construed under the provisions of 35 U.S.C. § 112, sixth paragraph, unless the element is expressly recited using the phrase "means for." Furthermore, no element, component or method step in the present disclosure is intended to be dedicated to the public, regardless of whether the element, component or method step is explicitly recited in the claims.

The embodiments in the present disclosure have been described with reference to drawings. The drawings illustrate certain details of specific embodiments that implement the systems, methods and programs of the present disclosure. However, describing the embodiments with drawings should not be construed as imposing any limitations that may be present in the drawings. The present disclosure contemplates methods, systems and program products on any machine-readable media for accomplishing its operations. The embodiments of the present disclosure may be implemented using an existing computer processor, or by a special purpose computer processor incorporated for this or another purpose or by a hardwired system.

As noted above, embodiments within the scope of the present invention include program products comprising non-transitory machine-readable media for carrying or having machine-executable instructions or data structures stored thereon. Such machine-readable media may be any available media that may be accessed by a general purpose or special purpose computer or other machine with a processor. By way of example, such machine-readable media may comprise RAM, ROM, EPROM, EEPROM, CD-ROM or other optical disk storage, magnetic disk storage or other magnetic storage devices, or any other medium which may be used to carry or store desired program code in the form of machine-executable instructions or data structures and which may be accessed by a general purpose or special purpose computer or other machine with a processor. Thus, any such a connection is properly termed a machine-readable medium. Combinations of the above are also included within the scope of machine-readable media. Machine-executable instructions comprise, for example, instructions and data which cause a general purpose computer, special purpose computer, or special purpose processing machines to perform a certain function or group of functions.

Embodiments in the present disclosure have been described in the general context of method steps which may be implemented in one embodiment by a program product including machine-executable instructions, such as program code, for example, in the form of program modules executed by machines in networked environments. Generally, program modules include routines, programs, objects, components, data structures, etc. that perform particular tasks or implement particular abstract data types. Machine-executable instructions, associated data structures, and program modules represent examples of program code for executing steps of the methods disclosed herein. The particular sequence of such executable instructions or associated data structures represent examples of corresponding acts for implementing the functions described in such steps.

As previously indicated, embodiments in the present disclosure may be practiced in a networked environment using logical connections to one or more remote computers having processors. Those skilled in the art will appreciate that such network computing environments may encompass many types of computers, including personal computers, hand-held devices, multi-processor systems, microprocessor-based or programmable consumer electronics, network PCs, minicomputers, mainframe computers, and so on. Embodiments in the disclosure may also be practiced in distributed computing environments where tasks are performed by local and remote processing devices that are linked (either by hardwired links, wireless links, or by a combination of hardwired or wireless links) through a communications network. In a distributed computing environment, program modules may be located in both local and remote memory storage devices.

An exemplary system for implementing the overall system or portions of the disclosure might include one or more computers including a processor, a system memory or database, and a system bus that couples various system components including the system memory to the processor. The database or system memory may include read only memory (ROM) and random access memory (RAM). The database may also include a magnetic hard disk drive for reading from and writing to a magnetic hard disk, a magnetic disk drive for reading from or writing to a removable magnetic disk, and an optical disk drive for reading from or writing to a removable optical disk such as a CD ROM or other optical media. The drives and their associated machine-readable media provide nonvolatile storage of machine-executable instructions, data structures, program modules and other data for the computer. User interfaces, as described herein, may include a computer with a monitor, a keyboard, a keypad, a mouse, a joystick or other input devices performing a similar function.

It should be noted that although the diagrams herein may show a specific order and composition of method steps, it is understood that the order of these steps may differ from what is depicted. For example, two or more steps may be performed concurrently or with partial concurrence. Also, some method steps that are performed as discrete steps may be combined, steps being performed as a combined step may be separated into discrete steps, the sequence of certain processes may be reversed or otherwise varied, and the nature or number of discrete processes may be altered or varied. The order or sequence of any element or apparatus may be varied or substituted according to alternative embodiments. Accordingly, all such modifications are intended to be included within the scope of the present disclosure. Such variations will depend on the software and hardware systems chosen and on designer choice. It is understood that all such variations are within the scope of the disclosure. Likewise, software and web implementations of the present invention could be accomplished with standard programming techniques with rule based logic and other logic to accomplish the various database searching steps, correlation steps, comparison steps and decision steps.

The foregoing description of embodiments has been presented for purposes of illustration and description. It is not intended to be exhaustive or to limit the subject matter to the precise form disclosed, and modifications and variations are possible in light of the above teachings or may be acquired from practice of the subject matter disclosed herein. The embodiments were chosen and described in order to explain the principals of the disclosed subject matter and its practical application to enable one skilled in the art to utilize the disclosed subject matter in various embodiments and with various modifications as are suited to the particular use contemplated. Other substitutions, modifications, changes and omissions may be made in the design, operating conditions and arrangement of the embodiments without departing from the scope of the presently disclosed subject matter.

Throughout the specification, numerous advantages of the exemplary embodiments have been identified. It will be understood, of course, that it is possible to employ the teachings herein without necessarily achieving the same advantages. Additionally, although many features have been described in the context of a particular data processor, it will be appreciated that such features could also be implemented in the context of other hardware configurations.

While the exemplary embodiments illustrated in the figures and described above are presently preferred, it should be understood that these embodiments are offered by way of example only. Other embodiments may include, for example, structures with different data mapping or different data. The disclosed subject matter is not limited to a particular embodiment, but extends to various modifications, combinations, and permutations that nevertheless fall within the scope and spirit of the appended claims.

What is claimed is:

1. A financial institution computing system, the system comprising:
   a network interface circuit enabling the financial institution computing system to exchange information over a network;
   a customer database retrievably storing information relating to a plurality of customers and at least one financial account for each of the plurality of customers; and
   a data exchange circuit communicatively engaged to the network interface circuit and the customer database, the data exchange circuit:
      receiving a financial operation request selected by a customer including detokenized account information from the network interface circuit, wherein the financial operation request is generated by an automated teller machine in response to a payment token representing account information received from a mobile wallet circuit on a mobile device of the customer including an associated permission allowing or disallowing transmission of data associated with the payment token; and
      authorizing the financial operation request based on information in the customer database;
   authorizing the financial request if the detokenized information includes a permission to perform financial operations at an automated teller machine; and wherein the financial operation request is rejected if the detokenized information does not include a permission to perform financial operations at an automated teller machine, wherein the permission to perform allows or disallows the transmission of data associated with the payment token as part of the financial operations and completing the financial operation selected by the customer.

2. The system of claim 1, wherein the detokenized information is received from a card network computing system.

3. The system of claim 2, wherein the automated teller machine generated the financial operation request as part of a purchase transaction request that further includes the payment token and a purchase amount.

4. The system of claim 3, wherein the purchase amount is a nominal or zero amount of funds.

5. The system of claim 1, wherein the detokenized information is received from an interbank network computing system.

6. The system of claim 1, wherein additional detokenized information is received from the customer database.

7. The system of claim 1, wherein the financial operation request includes a personal identification number; wherein the financial operation request is approved if the personal identification number matches a known personal identification number in the customer database; and wherein the financial operation request is rejected if the personal identification number does not match a known personal identification number in the customer database.

8. The system of claim 1, wherein the financial operation request includes a request to withdraw a sum of funds from an account identified in the detokenized account information, and wherein the data exchange circuit authorizes the financial operation request if the customer database indicates that the account contains sufficient funds to cover the sum of funds.

9. The system of claim 1, wherein the financial operation request further includes an automated teller machine identifier, and wherein the data exchange circuit transmits the financial operation request authorization to the automated teller machine using the automated teller machine identifier.

10. An automated teller machine comprising:
    a network interface circuit enabling the automated teller machine to exchange information over a network;
    an input/output device configured to exchange data with a mobile wallet circuit on a mobile device of a customer; and
    an automated teller machine circuit communicatively engaged to the network interface circuit and the input/output device, the automated teller machine circuit:
       receiving a payment token representing account information from the mobile wallet circuit through the input/output device including an associated permission allowing or disallowing transmission of data associated with the payment token as part of the financial operation selected by the customer;
       generating and transmitting a financial operation request including detokenized account information including an associated permission allowing or disallowing transmission of data associated with the payment token as part of the financial operation selected by the customer to be performed at the automated teller machine, and the customer selected financial operation over the network;
       receiving a request authorization from the network, wherein the request authorization prompts the automated teller machine to complete the customer selected financial operation in response to approval of the transmitted financial operation request.

11. The automated teller machine of claim 10, wherein the automated teller machine circuit generates the financial operation request as part of a purchase transaction request that further includes the payment token and a purchase amount.

12. The automated teller machine of claim 11, wherein the purchase amount is a nominal or zero amount of funds.

13. The automated teller machine of claim 10, wherein the financial operation request further includes customer authentication information.

14. The automated teller machine of claim 13, wherein the customer authentication information is a personal identification number received through the input/output device.

15. The automated teller machine of claim 10, wherein the input/output device is further configured to dispense a sum of cash identified in the financial operation request in response to the request authorization received by the automated teller machine circuit.

16. The automated teller machine of claim 10, wherein the automated teller machine is associated with an automated teller machine identifier, and wherein the automated teller machine circuit generates the financial operation request to include the automated teller machine identifier.

17. A method of completing financial operations at an automated teller machine, the method comprising:
    receiving, by a data exchange circuit at a financial institution computing system, a financial operation request selected by a customer including detokenized account information from a network interface circuit accessing a network, wherein the financial operation request is generated by the automated teller machine in response to a payment token received from a mobile wallet circuit on a mobile device of the customer, the payment token including an associated permission allowing or disallowing transmission of data associated with the payment token as part of the financial operation selected by the customer to be performed at the automated teller machine;

authorizing, by the data exchange circuit, the financial operation request based on information in a customer database retrievably storing information relating to a plurality of customers and at least one financial account for each of the plurality of customers and based on the payment token including the associated permission allowing the transmission of data associated with the payment token; and transmitting, by the data exchange circuit via the network interface circuit, a request authorization to the automated teller machine, wherein the automated teller machine performs a requested financial operation in response to the request authorization being approved.

18. The method of claim 17, wherein the automated teller machine generates the financial operation request as part of a purchase transaction request that further includes the payment token and a purchase amount.

19. The method of claim 17, wherein the financial operation request further includes an automated teller machine identifier, and wherein the data exchange circuit transmits the request authorization to the automated teller machine using the automated teller machine identifier.

* * * * *